Oct. 9, 1962  R. S. SINN  3,057,071
VELOCITY AND DISTANCE MEASURING SYSTEM AND METHOD
Filed June 7, 1957  2 Sheets-Sheet 1
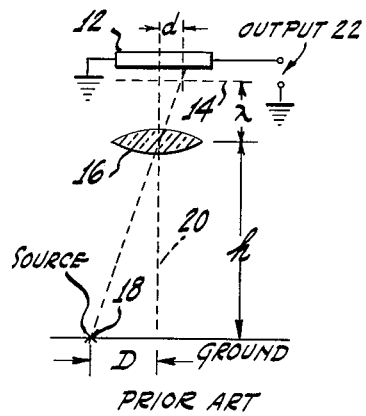
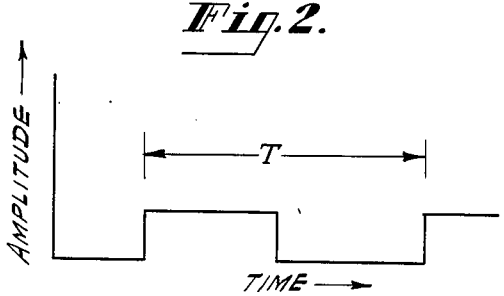
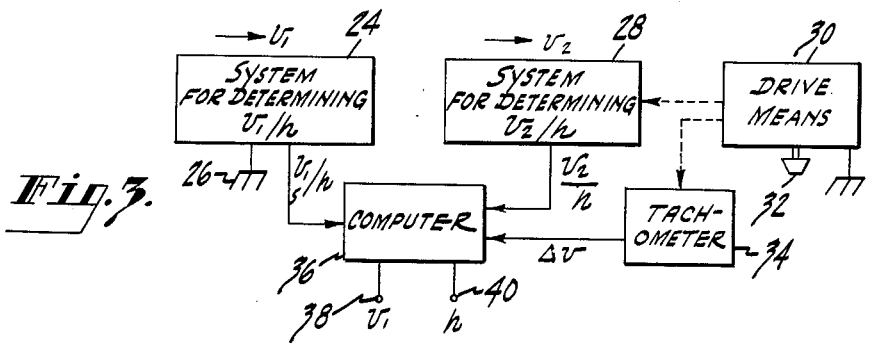
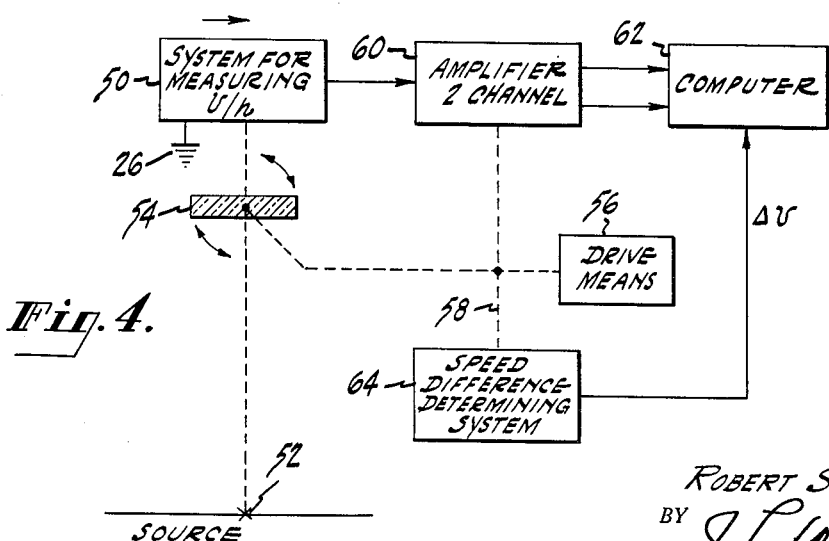
INVENTOR.
ROBERT S. SINN
BY
ATTORNEY Oct. 9, 1962 R. S. SINN 3,057,071
VELOCITY AND DISTANCE MEASURING SYSTEM AND METHOD
Filed June 7, 1957 2 Sheets-Sheet 2

INVENTOR.
ROBERT S. SINN
BY J. C. Whittaker
ATTORNEY

United States Patent Office 3,057,071
Patented Oct. 9, 1962

3,057,071
VELOCITY AND DISTANCE MEASURING SYSTEM
AND METHOD
Robert S. Sinn, Pennsauken, N.J., assignor to Radio Corporation of America, a corporation of Delaware
Filed June 7, 1957, Ser. No. 664,340
9 Claims. (Cl. 33—46)

The present invention relates to an improved system and method for measuring the velocity of one object relative to another. The invention is particularly applicable to airborne measurements and to the determination, for example, of the ground velocity and altitude of an aircraft.

An object of this invention is to provide an improved and greatly simplified system and method for passively measuring the ground velocity, ground track, and altitude of an aircraft.

A more general object of the invention is to provide an improved system and method for passively measuring the relative velocity between two objects, one or both of which may be moving.

Yet another object of the invention is to provide a system and method for determining, from the apparent velocity of an object, that is, its velocity divided by its altitude, both its real velocity and its altitude.

According to this invention, first the apparent velocity $$\frac{v_1}{h}$$

between two objects is determined by conventional means, where $v_1$ equals the real velocity between the two objects, and $h$ equals the distance along a reference coordinate between the two objects. In a form of the invention used to measure aircraft speed, for example, $v_1$ equals ground speed and $h$ equals altitude. The effective real velocity between the two objects is then changed by a known amount $\Delta v$ while maintaining $h$ substantially constant. The new apparent velocity $$\frac{v_1 + \Delta v}{h} = \frac{v_2}{h}$$

is then determined. Knowing $$\frac{v_1}{h}, \frac{v_2}{h}$$

and $\Delta v$, both $v_1$ and $h$ may be determined. In a fully automatic system, $$\frac{v_1}{h}, \frac{v_2}{h}$$

and $\Delta v$ are determined simultaneously or sequentially, this data is applied to a computer, and outputs are obtained indicative of $v_1$ and $h$.

The invention will be described in greater detail by reference to the following description taken in connection with the accompanying drawing in which:

FIGURE 1 is a schematic drawing showing the basic components of a prior art system for determining apparent velocity;

FIGURE 2 is a drawing, in somewhat idealized form, of the output signal obtained with the arrangement of FIGURE 1;

FIGURE 3 is a block diagram of one form of the present invention;

FIGURE 4 is a sketch of a system for sequentially determining $$\frac{v_1}{h} \text{ and } \frac{v_2}{h}$$

and

Figure 5:
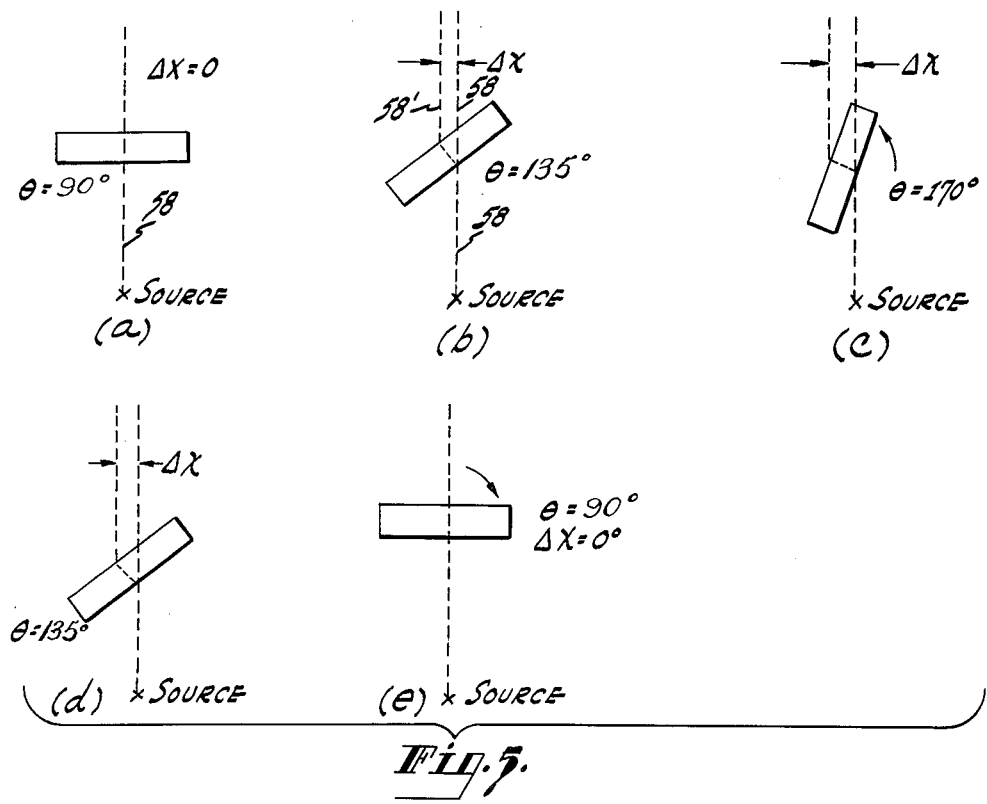
Figure 6:
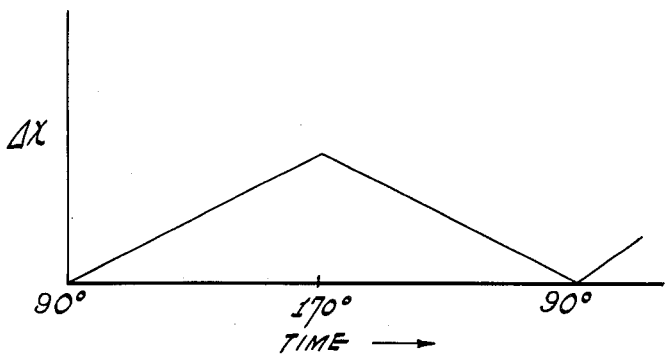

FIGURES 5 and 6 are sketches to explain the operation of the system of FIGURE 4.

Throughout the figures the same reference numerals are applied to similar elements.

The system of the present invention uses apparent velocity information to obtain real velocity information. FIGURE 1 illustrates a simplified form of prior art system for determining apparent velocity. The system includes a photocell 12, a grid 14 in front of the light sensitive surface of the photocell, and an optical system shown schematically as a lens 16. The optical system focuses light from a source 18 on the ground through the grid and onto the light sensitive surface of photocell 12. Source 18 may consist of a prominent landmark, a source of visible light, a source of infra-red waves, or, for that matter, with the proper type of collimating system, any source of radiation which is capable of being detected by a radiation sensitive device analogous to photocell 12. The distance between lens 16 and grid 14 is a known distance $\lambda$. The altitude $h$ of the aircraft is unknown. From geometric considerations, it can be seen that $$\frac{D}{d} = \frac{h}{\lambda} \quad (1)$$

where D is the distance between the intersection of vertical line 20 with the ground and source 18, and $d$ is the projection of distance D on grid 14.

Taking the time derivatives with $\lambda$ and $h$ constant $$\dot{D} = \frac{h}{\lambda} \dot{d} \quad (2)$$

where $\dot{D}$ is the time rate of change of D and is equal to $v_1$, the aircraft velocity, and $\dot{d}$ is the time rate of change of $d$, and is proportional to the aircraft velocity.

As the aircraft moves, the light from source 18 passes over lines of the grid. The lines interrupt the light reaching the photocell and the result is an alternating current signal at output terminals 22, as shown in FIGURE 2.

If $T$=the period of the signal and
$x$=the spacing between grid wires (center to center), then $$T\dot{d} = x$$

$$\dot{d} = \frac{x}{T} \quad (3)$$

Also $$\dot{D} = v_1 \quad (4)$$

Substituting Expressions 3 and 4 in Equation 2 gives $$\frac{v_1}{h} = \frac{x}{\lambda T} \quad (5)$$

where $x$, $\lambda$ and T are all either known or measurable.

It is to be understood that the system illustrated in FIGURE 1 is merely to explain, in a simple way, how $$\frac{v_1}{h}$$

is determined. In a practical system, means are included for eliminating undesired spurious signal components including background noise, and other means are included for orienting the grid to obtain maximum frequency output, an indication that the grid lines are oriented perpendicularly to the aircraft ground track direction. Practical apparent velocity measuring systems are described in Patent Nos. 2,772,479, 2,439,295, 2,446,845 and in an article by George L. Christian entitled "New Cameras Keep Pace With Supersonic Demands" in the November 21, 1955 issue of "Aviation Week."

In one form of the present invention, two apparent velocity measuring systems are required. One, like the one of FIGURE 1, measures the apparent velocity $$\frac{v_1}{h}$$

of the aircraft. The second system is effectively moved relative to the first and measures the apparent velocity $$\frac{v_2}{h}$$

where $v_2 = v_1 + \Delta v$, and $\Delta v$ is the difference in effective velocities between the two measuring systems.

Referring to FIGURE 3, the first apparent velocity measuring system is illustrated by block 24. It may be located in an aircraft and is fixed to the aircraft chassis, as indicated by symbol 26. This system moves at the aircraft velocity $v_1$ and its output, which may be an alternating or direct current or voltage, is a signal having a parameter indicative of $$\frac{v_1}{h}$$

The second system is illustrated by block 28. It moves at a velocity $v_2$, where $v_2$ differs from $v_1$ by a known velocity $\Delta v$. In its simplest form, system 28 may be identical to system 24. However, rather than being fixed to the aircraft chassis, it is moved along a track by a drive means 30. Both systems 28 and 24 should be oriented to produce maximum apparent velocities which means that their grids should be oriented perpendicular to the ground track direction. Drive means 30 may be a motor or the like and may move system 28 back and forth along the track in sawtooth quick return fashion. The speed of the drive means may be controlled by knob 32. The drive means also may be connected to drive a tachometer 34 at a speed corresponding to the speed of system 28, when the system is measuring $$\frac{v_2}{h}$$

for producing an output signal having a parameter proportional to $\Delta v$, the difference between velocities $v_1$ and $v_2$. Knowing $$\frac{v_1}{h}, \frac{v_2}{h}$$

and $\Delta v$, $v_1$ and $h$ may be computed as follows.
Assume $$\frac{v_1}{h} = a \quad (6)$$

$$\frac{v_2}{h} = b \quad (7)$$

$$v_2 - v_1 = \Delta v \quad (8)$$

Dividing (6) by (7) gives $$\frac{v_1}{v_2} = \frac{a}{b} \quad (9)$$

Substituting Equation 8 in Equation 9 and solving for $v_1$ $$v_1 = \frac{a \Delta v}{b - a} \quad (10)$$

where $a$, $b$ and $\Delta v$ are all known. After $v_1$ has been determined, its value can be substituted in Equation 6 and $h$ may be calculated.

The computation above may be carried out manually or automatically. FIGURE 3 shows an automatic system. The outputs of systems 24 and 28 and of tachometer 34 may be direct or alternating voltages. They are applied to a computer 36 which solves the equations above and provides output information at terminals 38 and 40 indicative of ground speed $v_1$ and altitude $h$. The computer itself may be an analog or digital computer. In the latter event, the computer block may include means for converting a voltage parameter, amplitude, for example, into digital information. In a non-automatic system, the voltages $$\frac{v_1}{h}, \frac{v_2}{h}$$

and $\Delta v$ may be applied to indicating devices such as meters; and the indications on the meters used in the equations above.

A practical way of changing the effective velocity of an aircraft from one value to another, which differs by a term $\Delta v$, is shown in FIGURE 4. The system 50 for measuring $$\frac{v}{h}$$

may be similar to the one shown in FIGURE 1. It is fixed to the aircraft frame. Positioned between the lens 16 (FIGURE 1) and the source 52 of radiation is a glass plate 54 which is driven by a drive means 56. The drive means is one of the type which first drives the glass plate clockwise and then counter clockwise. In the position of the plate shown in FIGURE 4 and in FIGURE 5a, the ray of light 58 passing through the plate is not deviated. However, as the plate rotates, the beam of light 58 is refracted and emerges as a beam 58' displayed a distance $\Delta x$ from the unrefracted ray. As indicated in FIGURES 5a, b and c, the greater the angle made by the plate with respect to the incident beam, the greater the displacement $\Delta x$ between the refracted and unrefracted rays. When the glass plate reaches a value close to 180°, the direction of rotation is reversed and the displacement $\Delta x$ between the refracted and unrefracted rays diminishes from its maximum value to zero. Upon reaching ninety degrees, the plate is again rotated counter clockwise, etc.

FIGURE 6 illustrates $\Delta x$ as a function of time. Preferably, the rotation of the plate clockwise and counter clockwise is at a speed such that $\Delta x$ is a linear function of time. During one direction of rotation of the glass plate, the effective real velocity of the aircraft is equal to its actual velocity minus the rate of change of $\Delta x$ with time. During the other direction of rotation of the glass plate, the effective real velocity of the aircraft is its actual velocity plus the rate of change of $\Delta x$ with time. (In both cases, it is assumed that the axis of rotation is perpendicular to the ground track direction and that the grid is oriented to give maximum frequency output.)

Returning to FIGURE 4, it can be seen that the system as described so far produces a first output $$\frac{v_1}{h}$$

when the plate is rotating in one direction and the second output $$\frac{v_2}{h}$$

when the plate is rotating in the opposite direction. These outputs may be applied to a two-channel amplifier 60 controlled by drive means 56. During clockwise rotation of the plate, one of the amplifier channels is cut off and the other passes a signal to computer 62, and during counter clockwise rotation of the plate, the reverse occurs. The difference $\Delta v$ between clockwise and counter clockwise motor speeds is determined by means 64. The computer determines from $$\frac{v_1}{h}, \frac{v_2}{h} \text{ and } \Delta v$$

(the absolute difference in speed of the transverse motion of the ray due to the motor rotation in one direction and the other) the real velocity and altitude of the aircraft, in the manner already indicated.

The invention has been described in terms of a system for determining the altitude and height of an aircraft. The system is shown mounted in the aircraft. It is to be understood that the system may instead be mounted on the ground and the aircraft used as the source, the speed and altitude of which are to be determined. In a system of this type, the angular deviation of the target from the axis of the ranging system must be known.

The system of this invention may also be used to determine the relative distance and speed between one moving body and another moving body provided the two bodies are moving along parallel courses. In a system of this type, an arrangement such as shown in FIGURE 3 is mounted on one of the aircrafts and it determines the relative speed and distance between that aircraft and the second aircraft which moves parallel to its course.

What is claimed is:

1. A method of determining the real velocity between two objects comprising the steps of measuring the apparent velocity $$\frac{v_1}{h}$$

between the two objects, where $v_1$ equals the unknown real velocity and $h$ equals the unknown distance between the two objects along a reference coordinate; effectively developing a real velocity between the two objects differing from $v_1$ by a known amount $\Delta v$ while maintaining $h$ substantially constant; and measuring the new apparent velocity $$\frac{v_1 + \Delta v}{h}$$

between the two objects, wherefrom the velocity $v_1$ and distance $h$ may be determined.

2. A method according to claim 1, wherein $$\frac{v_1}{h}$$

and $$\frac{v_1 + \Delta v}{h}$$

are measured simultaneously.

3. A system for determining the altitude and ground speed of an aircraft comprising, in combination, first means fixed to the aircraft for determining the apparent velocity $$\frac{v_1}{h}$$

where $v_1$ equals the unknown ground speed of the aircraft and $h$ equals the unknown altitude of the aircraft; second means on the aircraft movable with respect to the first means for determining a new apparent velocity $$\frac{v_2}{h}$$

where $v_2$ equals $v_1 + \Delta v$, and $\Delta v$ equals a known speed along the ground track direction in which the second means moves with respect to the first, means for moving the second means with respect to the first means along the ground track direction to thereby determine $$\frac{v_2}{h}$$

and means for determining the speed $\Delta v$, wherefrom the speed $v_1$ and altitude $h$ may be determined.

4. A system as set forth in claim 3, further including a computer connected to said first and second means and to the $\Delta v$ determining means for determining from $$\Delta v, \frac{v_2}{h} \text{ and } \frac{v_1}{h}, v_1 \text{ and } h$$

5. A system for determining the altitude and ground speed of an airborne vehicle comprising, in combination, first means on the vehicle for determining the apparent velocity $$\frac{v_1}{h}$$

where $v_1$ is a speed bearing a predetermined relation to the unknown ground speed of said vehicle and $h$ equals the unknown altitude of said vehicle; second means on the vehicle for determining a new apparent velocity $$\frac{v_2}{h}$$

where $v_2$ equals $v_1 + \Delta v$, and $\Delta v$ equals a known ground speed increment, and means for determining the known speed $\Delta v$, wherefrom the speed $v_1$ and altitude $h$ may be determined.

6. A system as set forth in claim 5, wherein the means for determining $$\frac{v_1}{h} \text{ and } \frac{v_2}{h}$$

comprise a grid having parallel lines oriented perpendicular to the ground track direction, a radiant energy focusing system for focusing energy radiated from a radiating source on the ground onto said grid during the movement of said vehicle, a radiant energy responsive means behind the grid for detecting the radiant energy passing through the grid, a transparent plate located between the focusing system and the source, and drive means connected to said plate for rotating the same clockwise and counter clockwise about an axis perpendicular to the ground track direction.

7. In combination, means for measuring the apparent velocity $$\frac{v_1}{h}$$

between two objects, where $v_1$ equals the unknown real velocity between the two objects and $h$ equals the unknown distance between the two objects along a reference coordinate; means for effectively changing the real velocity between the two objects by a known amount $\Delta v$ while maintaining $h$ substantially constant; and means for measuring the new apparent velocity $$\frac{v_1 + \Delta v}{h}$$

between the two objects, whereby the velocity $v_1$ and distance $h$ may be determined from the two apparent velocities and the velocity change $\Delta v$.

8. A system for determining the real velocity between two objects comprising a first means for measuring the apparent velocity $$\frac{v_1}{h}$$

between the two objects, where $v_1$ equals the unknown real velocity and $h$ equals the unknown distance between the two objects along a reference coordinate; a second means for effectively changing the real velocity between the two objects by a known amount $\Delta v$ while maintaining $h$ substantially constant; a third means for measuring the new apparent velocity $$\frac{v_1 + \Delta v}{h}$$

between the two objects, computer means for determining the value of $v_1$ from the equation $$v_1 = \frac{a \Delta v}{b - a}$$

where $$a = \frac{v_1}{h} \text{ and } b = \frac{v_1 + \Delta v}{h}$$

means for feeding said two apparent velocity measurements into said computer, and means for feeding said known amount $\Delta v$ into said computer.

9. A system for determining the altitude and ground speed of an aircraft comprising, in combination, first means fixed to the aircraft for determining the apparent velocity $$\frac{v_1}{h}$$

where $v_1$ equals the unknown ground speed of the aircraft and $h$ equals the unknown altitude of the aircraft; second means on the aircraft movable with respect to the first means for determining a new apparent velocity $$\frac{v_2}{h}$$

where $v_2$ equals $v_1 + \Delta v$, and $\Delta v$ equals a known speed along the ground track direction in which the second means moves with respect to the first, means for moving the second means with respect to the first means along the ground track direction to thereby determine $$\frac{v_2}{h}$$

means for determining the speed $\Delta v$, and computer means for determining $v_1$ from the equation $$v_1 = \frac{a \Delta v}{b-a} \text{ where } a = \frac{v_1}{h} \text{ and } b = \frac{v_1 + \Delta v}{h}$$

References Cited in the file of this patent
UNITED STATES PATENTS

| | | |
|---|---|---|
| 2,413,349 | Hancock | Dec. 31, 1946 |
| 2,482,795 | Philabaum | Sept. 27, 1949 |
| 2,643,457 | Skalka | June 30, 1953 |
| 2,772,479 | Doyle | Dec. 4, 1956 |
| 2,882,783 | Blackstone | Apr. 21, 1959 |